T. SHAW.
MOLD FOR PRESSING GLASS.
No. 24,360.          Patented June 7, 1859.
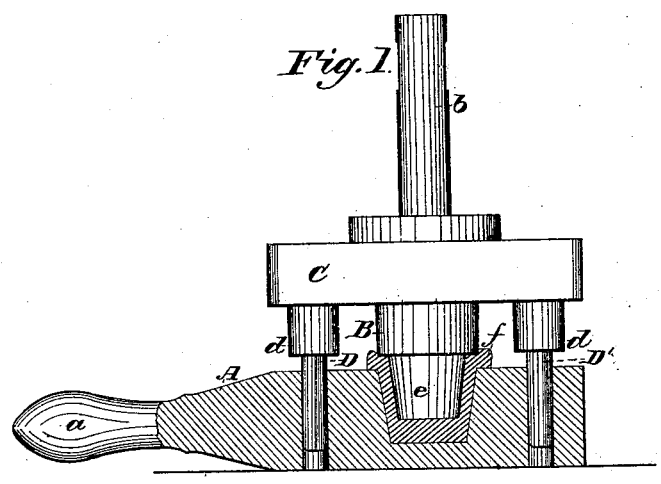
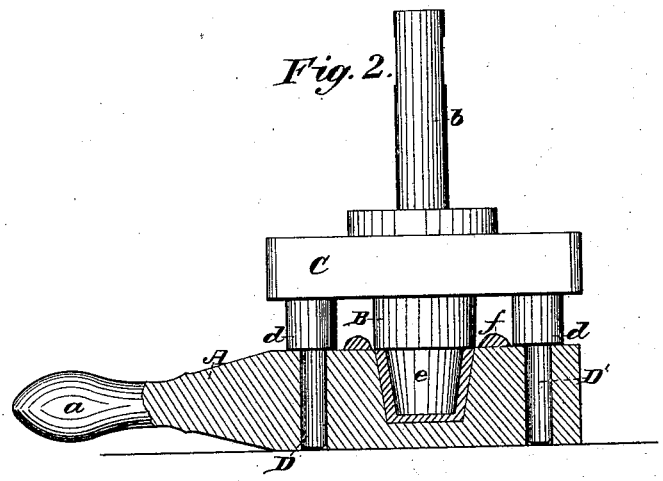
Witnesses:
Inventor:
Thomas Shaw

UNITED STATES PATENT OFFICE.

THOMAS SHAW, OF PHILADELPHIA, PENNSYLVANIA, ASSIGNOR TO HIMSELF AND JNO. C. BAILEY, OF SAME PLACE.

MOLD FOR PRESSING GLASS.

Specification of Letters Patent No. 24,360, dated June 7, 1859.

*To all whom it may concern:*

Be it known that I, THOS. SHAW, of the city and county of Philadelphia, State of Pennsylvania, have invented a new and useful Improvement in Molds for Pressing Glass; and I do hereby declare the following to be a full, clear, and exact description of the same, reference being had to the accompanying drawing and to the letters of reference marked thereon.

My invention consists in forming on the plunger of glass molds, a shoulder coinciding with the upper edge of the recess in the base of the mold, and in limiting the downward movement of the plunger, as fully described hereafter, so that the vessels or other glass articles pressed in the mold shall have a clear smooth and solid upper edge, and so that all the articles shall be invariably of the same thickness.

In order to enable others to make and use my invention, I will now proceed to describe its construction and operation.

On reference to the accompanying drawing which forms part of this specification—Figures 1 and 2, are views, partly in section, illustrating my improvement in molds for pressing glass.

A, is the cast iron base of the mold having a recess in the middle adapted to the form and height of the vessel to be pressed from molten glass.

B, is the plunger or upper portion of the mold which is attached by means of the projecting pin, *b*, and a key or other suitable device to the ram of an ordinary glass press. A cross-head C, attached to the plunger, B, is furnished at each end with a pin, D, which fitting snugly into holes in the base, A, of the mold serve to guide the plunger as it descends and to maintain it in its proper position concentric with the recess in the base. A shoulder, *d*, on each pin, D, serves to prevent the plunger from descending too deep into this recess. The lower portion, *e*, of the plunger is made of the exact form of the inside of the glass vessel to be pressed, and the length of this lower portion from its extreme end to the shoulder, F, where it joins the thicker portion of the plunger is equal to the depth of the inside of the vessel. The diameter of the plunger at the shoulder, F, is equal to the diameter of the top of the recess in the base of the mold so that on the descent of the plunger its enlarged portion will coincide with the upper edge of the recess the shoulder, *d*, on the pins, D, being so situated as to bear upon the upper surface of the base, A, and thus prevent the descent of the plunger when the shoulder, F, of the latter coincides with or is to the slightest extent below the upper edge of the recess as seen in Fig. 2.

In the ordinary process of pressing glass vessels it is usual to deposit in the recess of the base, A, of the mold, just glass sufficient to complete the vessel, the plunger being depressed until the glass rises to the surface of the base. Now it is evident that different quantities of glass must be deposited in the recess at different times inasmuch as it cannot be measured exactly when being poured in. If a little more glass than the proper quantity be deposited in the recess, it will, on the descent of the plunger rise to the surface before the glass at the bottom has been pressed to the proper thickness, and when less than the proper quantity of glass is poured in the recess the bottom must be pressed until it is inconveniently thin before the glass at the sides will rise to the surface of the base. It becomes necessary therefore to throw away many of the pressed vessels as imperfect and unfit for use. Various devices more or less troublesome to be managed, have been used in connection with this class of molds, in order to impart to the top of the glass a uniform level edge.

In using my improved mold molten glass more than sufficient to complete the vessel is first deposited in the recess of the base. As the plunger descends the superfluous glass will pass freely between the upper edge of the recess and the collar, F, of the plunger as seen in Fig. 1, and this free escape of the superfluous glass will continue until the plunger has descended to its lowest point when the edge of the shoulder, F, coincides with or is slightly below the upper edge of the recess as seen in Fig. 2, when the superfluous glass will be cut off from that remaining in the recess.

It will now be seen that by the use of my improvement not only will all the vessels pressed, be of the same form and thickness throughout, but a clear uniform and solid edge, free from any adhering particles of glass, will be imparted to the top of the vessel.

Although I have shown and described my improvement as applied to molds for pressing glass vessels such as tumblers it is evident that the same improvement may be applied to molds for forming almost every description of pressed glass articles for use or ornament.

I claim and desire to secure by Letters Patent,

Forming on the plunger, B, a shoulder, F, of a size corresponding to that of the upper edge of the recess in the base, A, of the mold, and limiting the downward movement of the plunger so that the said shoulder shall coincide or be slightly below the said upper edge of the recess substantially in the manner and for the purpose set forth.

In testimony whereof, I have signed my name to this specification in the presence of two subscribing witnesses.

THOMAS SHAW.

Witnesses:
HENRY HOWSOR,
CHARLES D. FREEMAN.